United States Patent
Sakano et al.

(10) Patent No.: US 6,420,515 B2
(45) Date of Patent: Jul. 16, 2002

(54) PREPARATION OF HEXAFLUOROPROPENE OXIDE POLYMERS

(75) Inventors: Yasunori Sakano; Noriyuki Koike, both of Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/729,427

(22) Filed: Dec. 5, 2000

(30) Foreign Application Priority Data

Dec. 6, 1999 (JP) .......................................... 11-346692

(51) Int. Cl.⁷ .......................... C08G 65/22; C08G 73/24
(52) U.S. Cl. ...................... 528/402; 528/220; 528/275; 528/425; 528/491; 524/755; 524/757; 524/795; 524/845
(58) Field of Search ................................ 528/402, 220, 528/275, 425, 491; 524/755, 757, 795, 845

(56) References Cited

U.S. PATENT DOCUMENTS 3,660,315 A   5/1972   Hill et al.
4,356,291 A   10/1982  Darling
5,919,973 A   7/1999   Matsuda et al.

FOREIGN PATENT DOCUMENTS

JP   53-5360     2/1978
JP   57-175185   10/1982

OTHER PUBLICATIONS

James T. Hill, "Polymers from hexafluoropropylene Oxide (HFPO)," *J. Macromol. Sci.–Chem.*, vol. A8, No. 3, pp. 499–520 (1974).

*Primary Examiner*—Duc Truong
(74) *Attorney, Agent, or Firm*—Millen, White, Zelano & Branigan, P.C.

(57) ABSTRACT

A perfluorodicarboxylic fluoride of the formula: F—CO—$CF_2$—O—Rf—O—$CF_2$—CO—F or perfluorodiketone of the formula: $R^1$—CO—Rf—CO—$R^1$ wherein Rf is a perfluoroalkylene group and $R^1$ is a $C_{1-8}$ perfluoroalkyl group is mixed with an alkali metal fluoride in an aprotic polar solvent to form an initiator solution. Hexafluoropropene oxide is fed to the initiator solution for polymerization, obtaining difunctional hexafluoropropene oxide polymers of high purity.

22 Claims, No Drawings

PREPARATION OF HEXAFLUOROPROPENE OXIDE POLYMERS

This invention relates to a method for preparing hexafluoropropene oxide (referred to as HFPO, hereinafter) polymers, and more particularly to a method for preparing essentially difunctional HFPO polymers having a minimized content of monofunctional HFPO polymer.

BACKGROUND OF THE INVENTION

One prior art method for preparing difunctional HFPO polymers is described in U.S. Pat. No. 3,250,807. This method is to react $FOC-(CF_2)_n-COF$ wherein n is from 0 to 6 with HFPO in an aprotic polar solvent in the presence of a catalyst such as an alkali metal fluoride or activated carbon, thereby forming difunctional HFPO polymers, as shown by the following reaction scheme.

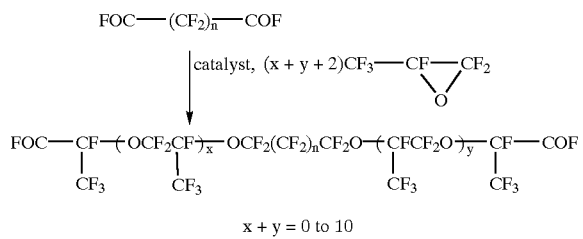

$x + y = 0$ to $10$

An attempt to add HFPO to previously furnished —COF groups as above, however, often gives rise to the problem that chain transfer side reaction occurs to form a HFPO polymer having a hexafluoropropyl group at one end (monofunctional HFPO polymer) as shown by the following scheme.

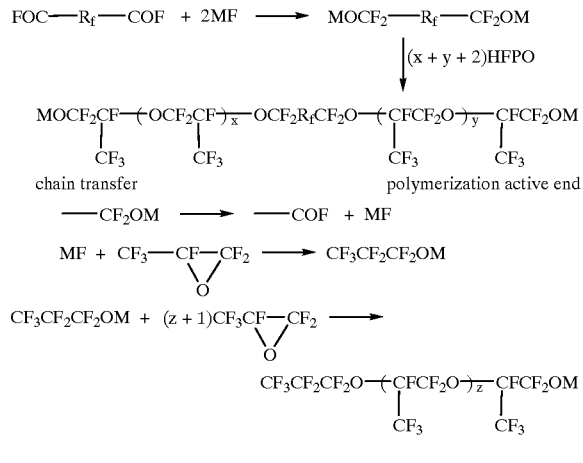

An improved method for preparing essentially difunctional HFPO polymers while preventing such chain transfer is disclosed in U.S. Pat. No. 3,660,315 or JP-B 53-5360. This method involves mixing the compound of the formula:

$$FOCCF(CF_3)OCF_2CF_2OCF(CF_3)COF \quad (3)$$

with cesium fluoride in tetraethylene glycol dimethyl ether to form the compound of the formula:

$$CsOCF_2CF(CF_3)OCF_2CF_2OCF(CF_3)CF_2OCs \quad (4),$$

and removing the excess of cesium fluoride from the solution, thereby forming a uniform solution, which is used as an initiator for the polymerization of HFPO. Specifically, after the excess of cesium fluoride is separated off, polymerization is effected at a low temperature of −60° C. to −30° C., thereby forming pure difunctional HFPO polymers having a number average molecular weight of about 50.

However, it is described in J. Macromol. Sci. Chem., A8(3), 499 (1974) that if the molar ratio of HFPO to the initiator is increased in order to produce difunctional HFPO polymers having a higher degree of polymerization, the side reaction to produce a monofunctional HFPO polymer increases and the purity of difunctional HFPO polymers lowers.

U.S. Pat. No. 4,356,291 or JP-A 57-175185 describes that a HFPO polymer having a number average molecular weight of 445 is obtained using highly purified HFPO in addition to the above initiator. It is pointed out that HFPO generally contains impurities such as hydrogen fluoride, acid fluorides and water, which limit the maximum degree of polymerization of polymers resulting from polymerization of HFPO. Then by subjecting highly purified HFPO to polymerization, a HFPO polymer having a high molecular weight is produced. However, no reference is made therein to the by-produced monofunctional HFPO polymer and the purity of the desired difunctional HFPO polymer.

Understandably, the prior studies on difunctional HFPO polymers placed a main focus on the reduction of undesired monofunctional HFPO polymers resulting from chain transfer and the formation of HFPO polymers having a high degree of polymerization.

All these methods, however, have the drawback that the compound of formula (3) itself contains monofunctional impurities. More particularly, the compound of formula (3) is generally prepared by the following method.

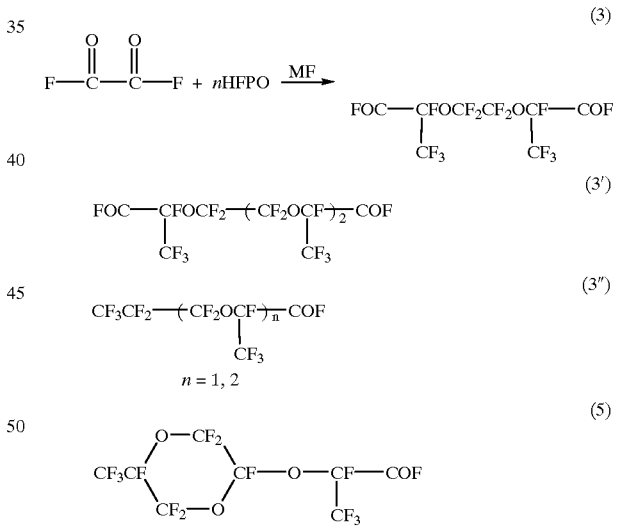

Upon reaction of oxalic fluoride with HFPO, there are produced not only the end compound of formula (3), but also HFPO oligomers as shown by formulas (3') and (3"). A precise distillation operation is necessary to separate these oligomers from the end compound. Still worse, the end compound purified by such a precise distillation operation yet contains about 4 to 6% by weight of the monofunctional component having a cyclic structure shown by the above formula (5). Undesirably, since this by-product of formula (5) has the same molecular weight as the end compound of formula (3), it is almost impossible in practice to separate the by-product by further distillation. Use of the fraction resulting from distillation as the initiator means that the monofunctional component already exists prior to the polymerization of HFPO.

On the other hand, known perfluorodicarboxylic fluorides include perfluoroadipic fluoride, perfluoroglutaric fluoride and perfluorosuccinic fluoride. If a polymerization initiator is prepared from these compounds in the same manner as the compound of the above formula (3), side reaction such as esterification can take place, failing to obtain an alcoholate equivalent to the perfluorodicarboxylic fluoride added. If polymerization of HFPO is carried out using this polymerization initiator, there are produced polymers having a wide molecular weight distribution because of the increased content of low molecular weight components. This polymerization initiator is inadequate.

Under the circumstances, it is desired in the polymerization of HFPO to prepare a polymerization initiator using a starting reactant which is available at a relatively low cost, which quantitatively forms an alcoholate with an alkali metal fluoride in an aprotic polar solvent and which is free of monofunctional impurities.

SUMMARY OF THE INVENTION

An object of the invention is to provide a method for preparing difunctional HFPO polymers having a minimized content of monofunctional HFPO polymer, using a polymerization initiator prepared from a starting reactant which is available at a relatively low cost.

We have found that when a perfluorodicarboxylic fluoride or perfluorodiketone of the general formula (1) or (2) shown below is mixed with an alkali metal fluoride in an aprotic polar solvent, there is obtained a uniform solution in which a quantitative amount of an alcoholate is formed. Subsequent polymerization of HFPO using this solution as a polymerization initiator results in a difunctional HFPO polymer which is substantially free from the terminal ether structure based on the compound of the above formula (5), has a narrow molecular weight distribution, and has a minimized content of monofunctional HFPO polymer.

Accordingly, the invention provides a method for preparing a hexafluoropropene oxide polymer comprising the steps of mixing a perfluorodicarboxylic fluoride or perfluorodiketone of the following general formula (1) or (2) with a metal fluoride in an aprotic polar solvent, and feeding hexafluoropropene oxide to the resulting solution.

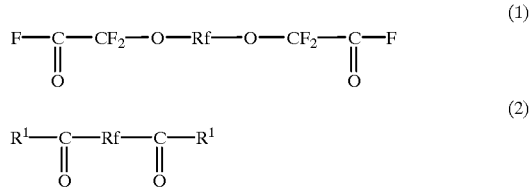

Herein Rf is a perfluoroalkylene group which may be separated by an oxygen atom, and $R^1$, which may be the same or different, is a perfluoroalkyl group of 1 to 8 carbon atoms.

DESCRIPTION OF THE PREFERRED EMBODIMENT

The method for preparation of HFPO polymers according to the invention uses as the polymerization initiator a solution which is prepared by mixing a perfluorodicarboxylic fluoride or perfluorodiketone of the general formula (1) or (2) with an alkali metal fluoride in an aprotic polar solvent. More particularly, the polymerization initiator is prepared by suspending an alkali metal fluoride in an aprotic polar solvent, adding a perfluorodicarboxylic fluoride or perfluorodiketone to the suspension, and agitating the mixture.

The alkali metal fluoride used herein is preferably cesium fluoride. Examples of the aprotic polar solvent include glymes such as monoglyme, diglyme, triglyme and tetraglyme, tetrahydrofuran and 1,4-dioxane, with the glymes being especially preferred.

With respect to the perfluorodicarboxylic fluoride or perfluorodiketone used herein, an inexpensive hydrocarbon dicarboxylic acid or hydrocarbon diester of the following general formula (6) or (7) is fluorinated by well-known fluorinating methods (including direct fluorination and electrolytic fluorination) to form a corresponding perfluoro compound of the general formula (1) or (2).

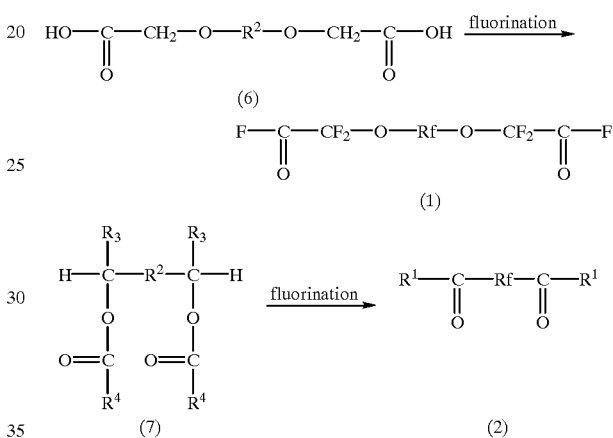

In the formulas, $R^2$ is an alkylene group which may be separated by an oxygen atom, Rf is a perfluoroalkylene group obtained by substituting fluorine atoms for all the hydrogen atoms in $R^2$. $R^3$ is an alkyl group of 1 to 8 carbon atoms, the $R^3$ groups may be the same or different, and $R^1$ is a perfluoroalkyl group of 1 to 8 carbon atoms obtained by substituting fluorine atoms for all the hydrogen atoms in $R^3$. $R^4$ is a substituted or unsubstituted monovalent hydrocarbon group, and the $R^4$ groups may be the same or different.

In formula (1) or (2), Rf is a perfluoroalkylene group which may be separated by an oxygen atom, as exemplified by the following.

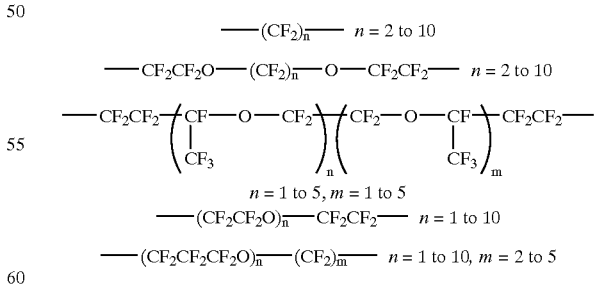

In formula (2), $R^1$ is a perfluoroalkyl group of 1 to 8 carbon atoms, as exemplified by the following:

wherein c is an integer of 1 to 8. These alkyl groups may be straight or branched.

In the practice of the invention, a polymerization initiator solution is prepared by adding the compound of formula (1) or (2) to a mixture of an aprotic polar solvent and an alkali metal fluoride. In the solution, the carbonyl group-bearing compound reacts with the alkali metal fluoride to form a corresponding alcoholate as shown below. The conversion to an alcoholate can be confirmed by infrared absorption analysis of the mixture solution. Depending on the type of the compounds of formulae (1) and (2), the alcoholate may be deposited as solid in the solution at room temperature (for example, 15 to 25° C.). In this case, by maintaining the temperature of the solution to 5° C. or less, unexpectedly or contrary to the ordinary compounds, the alcoholate may not be deposited in the solution and may be dissolved therein. So, it is preferred to maintain the temperature of the solution to 5° C. or less.

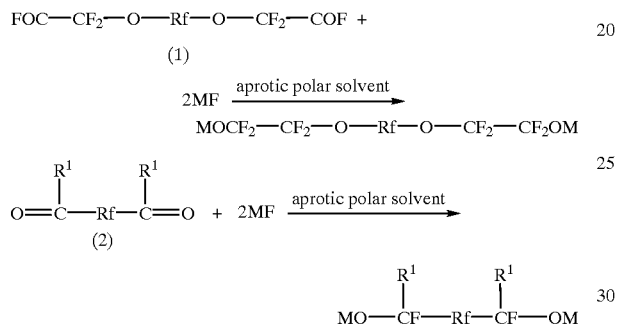

Rf and $R^1$ are as defined above.

The polymerization initiator represented by the above formula is present in the polymerization initiator solution desirably in a concentration of 10 to 60% by weight, especially 25 to 45% by weight.

To the polymerization initiator solution, a second solvent different from the solvent used upon preparation may be added for improving the flow at low temperatures. The second solvent may be one which is uniformly miscible with the initiator solution even at a low temperature below −30° C. and has a freezing point of lower than −50° C. Desirable are hydrocarbon compounds having one to three ether bonds in the molecule, for example, dimethyl ether, diethyl ether, ethyl methyl ether, methyl propyl ether, ethylene glycol dimethyl ether and tetrahydrofuran. The second solvent is added to reduce the viscosity of the initiator solution at a polymerization temperature in the range of −40° C. to −30° C. for thereby helping achieve efficient agitation. An appropriate amount of the second solvent added is about 20 to 60 parts by weight per 100 parts by weight of the initiator solution. Preferably the second solvent is previously dried to a water content of 50 ppm or lower.

Next, a perfluoroolefin such as hexafluoropropene (HFP) is reacted with the polymerization initiator solution in optional admixture with the second solvent for forming oligomers. This operation is necessary to remove any chain transfer-inducing substance in the polymerization initiator solution and second solvent, for helping initiate polymerization upon subsequent supply of HFPO.

The perfluoroolefins used herein include those of 2 to 9 carbon atoms, especially 3 to 6 carbon atoms. Examples are given below.

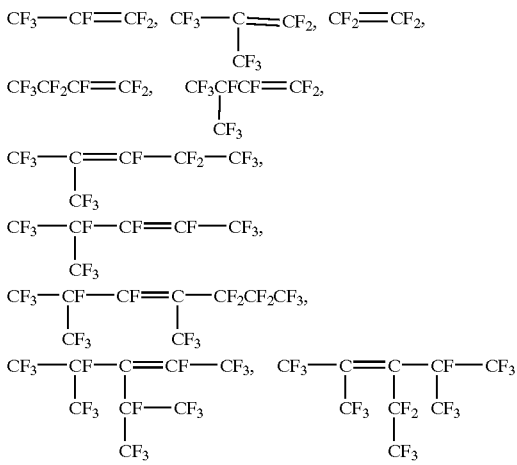

Of these, the following are especially preferred.

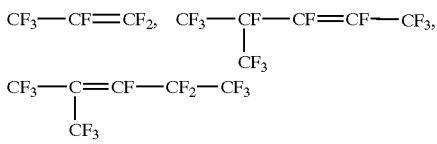

The amount of the perfluoroolefin used is not critical although it is usually used in an amount of about 0.5 to 100 parts, especially about 3 to 30 parts by weight per 100 parts by weight of the polymerization initiator solution.

Reaction with the perfluoroolefin is usually effected at a temperature of −30° C. to 50° C., preferably −25° C. to 30° C. Outside the range, too low a reaction temperature will require a longer time for reaction whereas too high a reaction temperature may cause decomposition of the initiator. The reaction time is not critical although the reaction time at a temperature of −25° C. to 30° C. is typically about 10 minutes to 2 hours, especially about 20 minutes to 1 hour including the time required for the perfluoroolefin addition.

While the initiator solution, preferably in admixture with the second solvent, is being agitated and cooled in a reactor, HFPO is fed to the reactor, thereby obtaining difunctional HFPO polymers. It is possible to add hexafluoropropene (HFP) at the same time as the HFPO feed. The addition of HFP is effective for increasing flow because it dilutes the reaction solution which gradually thickens with the progress of polymerization. During the polymerization, the reaction solution is preferably kept at a temperature of −45° C. to −30° C. Below −45° C., the reaction solution may increase its viscosity and thixotropy, interfering with efficient agitation. Under such situation, part of the non-flowing reaction product will stick to the reactor inner wall or agitator blade to further interfere with uniform agitation, resulting in polymers having a wider molecular weight distribution. Temperatures above −30° C. tend to induce chain transfer reaction to form monofunctional HFPO polymers.

Agitation is important for the reaction solution as a whole to maintain uniform fluidity. A choice is generally made of anchor, paddle, helical ribbon and impeller agitators, depending on the shape and size of the reactor. The number of revolutions is not critical and may be adjusted in accordance with the shape of agitator blade so as to achieve an optimum agitation efficiency.

Preferably the HFPO is continuously fed using a flow meter such as a mass flow controller. A constant rate of HFPO feed is necessary in order to maintain the temperature of the reaction solution in an appropriate range. An appropriate hourly feed rate is about 3 to 15 mol, especially about 5 to 10 mol of HFPO per mol of the initiator. The feed amount is determined as appropriate in accordance with the desired molecular weight and may range from about 30 to 400 mol per mol of the initiator. Since increasing the relative amount of HFPO to a higher level will result in HFPO polymers having a non-negligible amount of monofunctional polymer mixed therein, the feed amount is usually about 30 to 200 mol per mol of the initiator.

The HFP may be fed at the same time as the HFPO and in an amount equal to ¼ to ¾ of the weight of HFPO. After the completion of HFPO feed, agitation is continued for a further 1 to 2 hours. Thereafter, the reaction solution is heated and the end product is separated out. In this way, difunctional HFPO polymers of the following formula (8) or (9) are obtained.

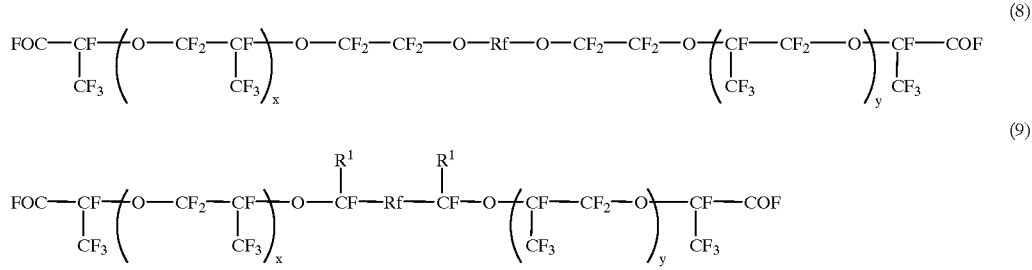

Rf and $R^1$ are as defined above, x and y are positive integers.

The difunctional HFPO polymers of the formula (8) or (9) will contain a minor amount of monofunctional HFPO polymers formed during the reaction process. Since the starting reactant, perfluorodicarboxylic fluoride or perfluorodiketone does contain little of monofunctional impurities, the final content of monofunctional impurities in the difunctional HFPO polymers of the formula (8) or (9) is suppressed dramatically low.

The thus obtained difunctional HFPO polymers are terminated with —COF groups. Then a variety of useful derivatives can be synthesized therefrom by converting the terminal groups into other functional groups. These derivatives will find use in liquid rubber, coating material and sealing material.

Since a perfluorodicarboxylic fluoride or perfluorodiketone which is available at a relatively low cost, which quantitatively forms an alcoholate with an alkali metal fluoride in an aprotic polar solvent and which is free of monofunctional impurities is used as the starting reactant, the invention is successful in producing difunctional HFPO polymers of high purity having a minimized content of monofunctional HFPO polymer and low molecular weight components.

EXAMPLE

Examples of the invention are give below by way of illustration and not by way of limitation.

Example 1

Preparation of Initiator

A 2-liter glass flask was thoroughly purged with dry nitrogen and charged with 31.0 g of cesium fluoride and 115.3 g of tetraglyme. With stirring at 0° C. in a dry nitrogen atmosphere, 33.3 g of perfluorodicarboxylic fluoride of 99.0% purity represented by the formula (10) below was added to the flask using a syringe.

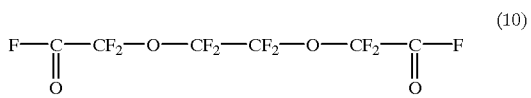

Immediately after addition, heat generation was observed. The alcoholate obtained would be deposited as solid in the solution at room temperature. So, the temperature of the solution was kept at 5° C. or less. After about 5 hours of agitation, the reaction solution was allowed to stand. The reaction solution was a uniform, pale yellow, clear liquid except for some precipitates of excessive cesium fluoride at 0° C.

A sample taken from the solution was analyzed by infrared absorption spectroscopy, in which the absorption peak in proximity to 1880 cm$^{-1}$ attributable to —COF group was not observed. Another sample of the solution was dissolved in water. The amount of carboxylic acid and hydrofluoric acid resulting from hydrolysis was determined by alkali titration, and the amount of alcoholate in the original solution was computed as the —CF$_2$OCs concentration (mmol/g), which was 1.09 mmol/g. These measurement results are shown in Table 1 together with the theoretical —CF$_2$OCs concentration (the amount of alcoholate equivalent to the amount of perfluorodicarboxylic fluoride (assumed to be 100% pure) added).

Polymerization of HFPO

A 0.5-liter reactor equipped with an anchor agitator was charged with 12.9 g of the above-prepared initiator solution and 3.7 g of ethylene glycol dimethyl ether. While agitating at 180 rpm, the reactor was cooled in a coolant bath adjusted at −10° C.

Step 1

When the internal temperature of the reactor reached −7° C., 2.1 g of HFP was fed at a rate of 4.2 g/hr.

Step 2

The coolant bath was reset at −40° C. When the internal temperature of the reactor reached −38° C., 2.1 g of HFP was further fed at a rate of 4.2 g/hr.

Step 3

Next, 114 g of HFPO and 57 g of HFP were fed over about 15 hours at a rate of 7.6 g/hr and 3.8 g/hr, respectively. Mass flow controllers were used for adjusting the flow rate. The liquid within the reactor was kept between −38° C. and −35° C. during the HFPO feed.

After the completion of HFPO feed, agitation was continued for a further 1 hour, and the coolant bath was allowed to warm up to room temperature. During the process, some heat generation was ascertained and evaporation of HFP observed.

The reactor contents were poured into 100 g of ethanol, which was thoroughly agitated. The lower layer was washed with 100 g of ethanol. By holding for phase separation, taking out the lower layer, filtering off the solids, and distilling off the volatiles at 120° C./10 mmHg, 118 g of a terminally ethyl esterified HFPO polymer was collected as a colorless clear oil.

The oily HFPO polymer was measured for viscosity at 25° C. and analyzed by $^{19}$F-NMR, by which a number average molecular weight and the content of monofunctional heptafluoropropyl (—$C_3F_7$) group were determined. The results are shown in Table 2.

$^{19}$F-NMR

The number average molecular weight and the content of terminal heptafluoropropyl group formed during polymerization were determined as follows.

$$C_2H_5OC\overset{O}{\overset{\|}{-}}\overset{②}{CF}\overset{}{-}(\overset{①}{OCF_2CF})_x\overset{}{-}O\overset{}{-}R_f'\overset{}{-}O\overset{}{-}(\overset{①}{CFCF_2O})_y\overset{②}{CF}\overset{O}{\overset{\|}{-}}COC_2H_5$$
$$\qquad\quad CF_3\qquad\quad CF_3\qquad\qquad\qquad CF_3\quad\quad CF_3$$

$R_f' = $ —$CF_2CF_2OCF_2CF_2OCF_2CF_2$—

$$CF_3CF_2CF_2O\overset{}{-}(\overset{①}{CFCF_2O})_z\overset{③}{CF}\overset{O}{\overset{\|}{-}}COC_2H_5$$
$$\qquad\qquad\quad CF_3\qquad\quad CF_3$$

Number average molecular weight=$2r/(s+t/2)$ —$C_3F_7$ content=$t/(s+t/2)\times100$ mol %

| | Chemical shift (ppm) | Integration ratio |
|---|---|---|
| (1) | −145.4 | r |
| (2) | −132.3 | s |
| (3) | −130.7 | t |

Example 2

Preparation of Initiator

A 2-liter glass flask was thoroughly purged with dry nitrogen and charged with 31.0 g of cesium fluoride and 115.3 g of tetraglyme. With stirring in a dry nitrogen atmosphere, 40.2 g of perfluorodiketone of 98.7% purity represented by the formula (11) below was added to the flask using a syringe.

$$CF_3\overset{}{-}\overset{O}{\overset{\|}{C}}\overset{}{-}CF_2\overset{}{-}CF_2\overset{}{-}CF_2\overset{}{-}CF_2\overset{}{-}\overset{O}{\overset{\|}{C}}\overset{}{-}CF_3 \qquad (11)$$

Immediately after addition, heat generation was observed. After about 5 hours of agitation, the reaction solution was allowed to stand. The reaction solution was a uniform, pale yellow, clear liquid except for some precipitates of excessive cesium fluoride.

A sample taken from the solution was analyzed by infrared absorption spectroscopy, in which the absorption peak in proximity to 1880 $cm^{-1}$ attributable to —COF group was not observed. Another sample of the solution was dissolved in water. The amount of carboxylic acid and hydrofluoric acid resulting from hydrolysis was determined by alkali titration, and the amount of alcoholate in the original solution was computed as the —$CF_2$OCs concentration (mmol/g), which was 1.06 mmol/g. These measurement results are shown in Table 1 together with the theoretical —$CF_2$OCs concentration (the amount of alcoholate equivalent to the amount of perfluorodiketone (assumed to be 100% pure) added).

Polymerization of HFPO

A 0.5-liter reactor equipped with an anchor agitator was charged with 13.2 g of the above-prepared initiator solution and 3.7 g of ethylene glycol dimethyl ether. While agitating at 180 rpm, the reactor was cooled in a coolant bath adjusted at −10° C.

Step 1

When the internal temperature of the reactor reached −7° C., 2.1 g of HFP was fed at a rate of 4.2 g/hr.

Step 2

The coolant bath was reset at −40° C. When the internal temperature of the reactor reached −38° C., 2.1 g of HFP was further fed at a rate of 4.2 g/hr.

Step 3

Next, 114 g of HFPO and 57 g of HFP were fed over about 15 hours at a rate of 7.6 g/hr and 3.8 g/hr, respectively.

Mass flow controllers were used for adjusting the flow rate. The liquid within the reactor was kept between −38° C. and −35° C. during the HFPO feed.

After the completion of HFPO feed, agitation was continued for a further 1 hour, and the coolant bath was allowed to warm up to room temperature. During the process, some heat generation was ascertained and evaporation of HFP observed.

The reactor contents were poured into 100 g of ethanol, which was thoroughly agitated. The lower layer was washed with 100 g of ethanol. By holding for phase separation, taking out the lower layer, filtering off the solids, and distilling off the volatiles at 120° C./10 mmHg, 120 g of a terminally ethyl esterified HFPO polymer was collected as a colorless clear oil.

The oily HFPO polymer was measured for viscosity at 25° C. and analyzed by $^{19}$F-NMR, by which a number average molecular weight and the content of monofunctional heptafluoropropyl (—$C_3F_7$) group were determined. The results are shown in Table 2.

$^{19}$F-NMR

The number average molecular weight and the content of terminal heptafluoropropyl group formed during polymerization were determined by the same procedure as in Example 1.

Comparative Example 1

Preparation of Initiator

A polymerization initiator was prepared by the same procedure as in Example 1, using 52.8 g of perfluorodicarboxylic fluoride of the formula (3) shown below containing 5.3 mol % of cyclic monofunctional component of formula (5) as an impurity, 37.7 g of cesium fluoride and 140.1 g of tetraglyme. The resulting reaction solution was a uniform, pale yellow, clear liquid except for some precipitates of excessive cesium fluoride.

$$FOC\overset{}{-}\overset{}{CF}OCF_2CF_2O\overset{}{CF}\overset{}{-}COF \qquad (3)$$
$$\qquad\quad CF_3\qquad\qquad\quad CF_3$$

A sample taken from the solution was analyzed by infrared absorption spectroscopy, in which the absorption peak in proximity to 1880 cm$^{-1}$ attributable to —COF group was not observed. The amount of alcoholate in the original solution was similarly computed as the —CF$_2$OCs concentration, which was 1.02 mmol/g. These measurement results are shown in Table 1 together with the theoretical —CF$_2$OCs concentration.

Polymerization of HFPO

A reactor as used in Example 1 was charged with 14.5 g of the above-prepared initiator solution and 4.3 g of ethylene glycol dimethyl ether. While agitating at 180 rpm, the reactor was cooled in a coolant bath adjusted at −10° C.

Step 1

When the internal temperature of the reactor reached −7° C., 2.1 g of HFP was fed at a rate of 4.3 g/hr.

Step 2

The coolant bath was reset at −40° C. When the internal temperature of the reactor reached −38° C., 2.1 g of HFP was further fed at a rate of 4.3 g/hr.

Step 3

Next, 125 g of HFPO and 63 g of HFP were fed over about 15 hours at a rate of 8.3 g/hr and 4.2 g/hr, respectively.

The liquid within the reactor was kept between −38° C. and −35° C. during the HFPO feed.

After the completion of HFPO feed, the same process as in Example 1 was followed, collecting 125 g of a terminally ethyl esterified HFPO polymer. The HFPO polymer was similarly analyzed, with the results shown in Table 2.

Comparative Example 2

Preparation of Initiator

A polymerization initiator was prepared by the same procedure as in Example 1, using 30.0 g of perfluoroadipic fluoride, 36.5 g of cesium fluoride and 135.7 g of tetraglyme. Even after about 5 hours of agitation of the resulting solution, the liquid phase remained separate, indicating that cesium fluoride was not fully dissolved. In infrared absorption spectroscopy of the upper liquid phase, a sharp peak attributable to the carbonyl group was observed in proximity to 1820 cm$^{-1}$. The amount of alcoholate was similarly computed as the —CF$_2$OCs concentration by alkali titration as in Example 1. The concentration was 0.74 mmol/g which is only 64% of the theoretical value.

TABLE 1

Polymerization initiator

|  | E1 | E2 | CE1 | CE2 |
|---|---|---|---|---|
| —CF$_2$OCs concentration, found (mmol/g) | 1.09 | 1.06 | 1.02 | 0.74 |
| —CF$_2$OCs concentration, calc., (mmol/g) | 1.12 | 1.08 | 1.07 | 1.03 |
| IR absorption of carbonyl | not | not | not | found |

TABLE 2

Polymerization of HFPO

|  | E1 | E2 | CE1 |
|---|---|---|---|
| Number average molecular weight | 97 | 105 | 101 |
| —C$_3$F$_7$ content (mol %) | 4.8 | 6.1 | 5.7 |
| Monofunctional component content in initiator (mol %) | <1.5 | <1.5 | 5.3 |
| Viscosity (25° C., cs) | 3160 | 3200 | 3280 |

Although the content of monofunctional HFPO polymer (represented by the —C$_3$F$_7$ content in Table 2) formed during the polymerization process to difunctional HFPO polymers does not substantially differ between Examples 1, 2 and Comparative Example 1, the content of monofunctional impurity in the final product is extremely low in Examples 1, 2 because the content of monofunctional impurities in the polymerization initiator is extremely lower in Examples 1, 2 than in Comparative Example 1. In the preparation of the polymerization initiator, the alcoholate was formed in an amount approximately equivalent to the starting perfluorodicarboxylic fluoride or perfluorodiketone, and consequently, the difunctional HFPO polymers in Examples 1 and 2 have a sharp degree-of-polymerization distribution.

Japanese Patent Application No. 11-346692 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A method for preparing a hexafluoropropene oxide polymer comprising:

(a) mixing a perfluorodicarboxylic fluoride or perfluorodiketone of formula (1) or (2):

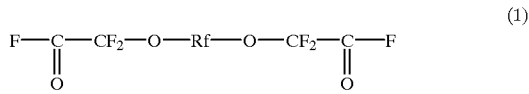

(1)

(2)

wherein Rf is a perfluoroalkylene group which optionally comprises 1 or more oxygen atoms, and R$^1$, each independently, is a perfluoroalkyl group of 1 to 8 carbon atoms, with an alkali metal fluoride in an aprotic polar solvent to form a solution, and (b) feeding hexafluoropropene oxide to the solution.

2. A method of claim 1 further comprising adding a perfluoroolefin to the solution before (b).

3. A method of claim 1 further comprising adding a perfluoroolefin to the solution simultaneously with (b).

4. A method of claim 1, wherein the alkali metal fluoride is cesium fluoride.

5. A method of claim 1, wherein the aprotic polar solvent is a glyme.

6. A method as in claim 1, wherein the solution is maintained at a temperature of 5° C. or less.

7. A method as in claim 1, wherein the perfluorodicarboxylic fluoride or perfluorodiketone of formula (1) or (2) comprise 10 to 60% by weight of the solution of (a).

8. A method as in claim 1, wherein the perfluorodicarboxylic fluoride or perfluorodiketone of formula (1) or (2) comprises 25 to 45% by weight of the solution of (a).

9. A method as in claim 1, wherein a second solvent, which is a hydrocarbon compound having one to three ether bonds, is added to the solution at about 20 to 60 parts by weight per 100 parts by weight of the solution.

10. A method of claim 1, further comprising adding a perfluoroolefin to the solution before or simultaneously with (b).

11. A method of claim 10, wherein the perfluoroolefin is hexafluoropropene.

12. A method of claim 10, wherein the perfluoroolefin is

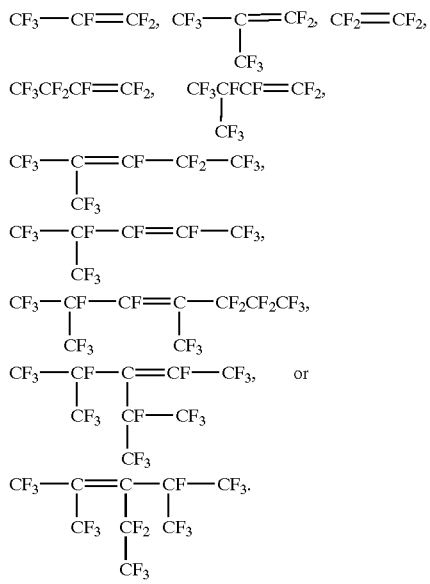

13. A method of claim 10, wherein the perfluoroolefin is

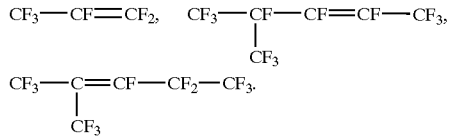

14. A method of claim 1, wherein the hexafluoropropene oxide is fed at an hourly rate of about 3 to 15 mol of the solution until about at total of 30 to 400 mol of hexafluoropropene oxide is fed per mol of the solution.

15. A method of claim 14, wherein the hexafluoropropene oxide is fed at an hourly rate of about 5 to 10 mol per mol of the solution.

16. A method of claim 14, wherein about a total of 30 to 200 mol of hexafluoropentene oxide is fed per mol of the solution.

17. A method of claim 14, wherein the hexafluoropentene oxide is continuously fed.

18. A method of claim 3, wherein adding the perfluoroolefin is by feeding said perfluoroolefin to the solution at a rate which is ¼ to ¾ of the feeding rate of the hexafluoropropene oxide.

19. A method of claim 10, wherein perfluoroolefin is added in an amount of about 0.5 to 100 parts by weight per 100 parts by weight of the solution.

20. A method of claim 10, wherein the perfluoroolefin has 3 to 6 carbon atoms.

21. A method of claim 10, wherein the perfluoroolefin has 2 to 9 carbon atoms.

22. A method for preparing a hexafluoropropene oxide polymer comprising feeding hexafluoropropene oxide to a solution of an aprotic polar solvent, an alkali metal fluoride and a perfluorodicarboxylic fluoride or perfluorodiketone of formula (1) or (2):

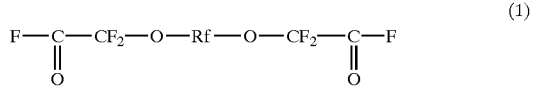

wherein Rf is a perfluoroalkylene group which optionally comprises 1 or more oxygen atoms, and $R^1$, each independently, is a perfluoroalkyl group of 1 to 8 carbon atoms.

* * * * *